United States Patent [19]

Shiraishi et al.

[11] Patent Number: 5,476,425
[45] Date of Patent: Dec. 19, 1995

[54] CONTROL DEVICE AND METHOD FOR AUTOMATIC TRANSMISSION

[75] Inventors: Takashi Shiraishi, Oomiya; Naoyuki Ozaki, Katsuta; Toshimichi Minowa, Toukai; Hiroshi Kimura, Katsuta, all of Japan

[73] Assignee: Hitachi, Ltd., Japan

[21] Appl. No.: 134,614

[22] Filed: Oct. 12, 1993

[30] Foreign Application Priority Data

Oct. 13, 1992 [JP] Japan .................. 4-274444

[51] Int. Cl.$^6$ ................................ B60K 41/10
[52] U.S. Cl. .................. 477/109; 477/110; 477/121
[58] Field of Search ..................... 477/107, 109, 477/110, 121, 97

[56] References Cited

U.S. PATENT DOCUMENTS 5,012,695 5/1991 Kyohzuka et al. ........... 477/110 X
5,016,494 5/1991 Yamaguchi ................ 477/109
5,050,453 9/1991 Yamaguchi ............... 477/107 X Primary Examiner—Charles A. Marmor
Assistant Examiner—Peter Kwon
Attorney, Agent, or Firm—Evenson, McKeown, Edwards & Lenahan

[57] ABSTRACT

In an attempt to accomplish an object to absorb a driving torque difference caused by a difference in a change gear ratio between before and after shifting and to reduce a shift shock, adopted is such a constitution that target driving torque characteristics with which said driving torque before and after shifting will become nearly equal are stored, and engine torque control will be effected according to said characteristics. The control device is so constituted that, during shifting, the engine torque is decreased to suppress a driving torque variation resulting from inertia variation, and the engine torque before a specific period from the completion of shifting is outputted higher than the normal torque, and the engine torque before a specific period from the completion of shifting is outputted higher than the normal torque to reset to the normal engine torque after the specific period after the completion of shifting.

14 Claims, 9 Drawing Sheets

CONTROL DEVICE AND METHOD FOR AUTOMATIC TRANSMISSION

BACKGROUND OF THE INVENTION

The present invention relates to a device for reducing a shift shock which is likely to occur when gear shifting is made by an automatic transmission of a car.

It has been a known practice to reduce a shift shock during an upshift of a car by decreasing an engine torque during shifting through the control of an ignition timing or a quantity of fuel injection for purpose of diminishing a difference in an inertia energy caused by a difference of engine speed between before and after shifting as stated in the specification of Japanese Patent Application No. 4-63138 pertaining to an application of the present patent applicant.

However, in gear shifting occurring during acceleration with the depth of depression of an accelerator pedal unchanged, that is, in a so-called automatic upshift, a gear ratio (engine speed/output shaft speed) after the shift becomes low; therefore a torque produced in the drive shaft varies step by step if the engine speed remains unchanging. To absorb this absolute torque change after shifting is made for the purpose of decreasing a shock at the time of shifting in order to insure smooth speed change, it is imperative to reduce the engine torque substantially during a short period of time. However, in such a construction that the engine torque is transmitted to the driving shaft side through a torque converter as in an automatic transmission, the engine torque can not be transmitted to the driving shaft side if the engine speed is not kept at some level. Here, the engine speed after upshifting lowers according to a gear ratio; therefore when a shock during shifting is lessened by decreasing the engine torque, there exists such a problem that if the engine torque is decreased excessively, the rate of decrease of the engine speed is accelerated to result in an engine speed drop after the completion of in a the shift, and driving torque drop after shifting and a lowered effect of shock reduction.

The present invention has been accomplished in an attempt to solve the aforementioned problem and has as its object the provision of a device and method for controlling an automatic transmission which is capable of eliminating a torque difference between before and after shifting, suppressing inertia variation during a shift, and further insuring driving safety without deteriorating operation performance even in the event of a sensor trouble.

To accomplish the aforementioned object, the control device pertaining to the present invention basically has a control means for controlling an engine torque and a transmission control means for controlling an automatic transmission; the control device comprising a means for nearly equivalently setting a driving torque immediately before starting a shift and a driving torque immediately after completion of the shift, and a means for suppressing a torque variation during gear shifting.

As a more concrete example, the control device has the control means for controlling the engine torque, the transmission control means for controlling the automatic transmission, and a means for reducing the engine torque during gear shifting, for the purpose of lessening a shift shock; the control device comprising a means for increasing the engine torque during a specific period before the completion of shifting than a common engine and further for resetting the engine torque, torque after a specific period after the completion of shifting to a common output.

Furthermore, the control device has the control means for controlling the engine torque, the transmission control means for controlling the automatic transmission, and the means for decreasing the engine torque during shifting, thereby lessening a shift shock; the control device comprising the means for nearly equivalently setting the driving torque immediately before the starting of shifting and the driving torque immediately after the completion of shifting, and a means for increasing the engine torque from a specific period before the completion of shifting than the common engine torque, and for resetting the engine torque after a specific period after the completion of shifting to a common output.

Furthermore, as a control means for controlling the engine torque, for example an electronic throttle valve or a large-capacity idle speed control valve and so forth may be used.

The engine torque at which the driving torques before and after shifting will become nearly equal is estimated from the gear ratio before and after shifting and characteristics of the torque converter, giving the engine the quantity of intake air occurring at this engine torque. During shifting, the quantity of intake air is decreased in accordance with a shift command signal and turbine rotation on the output side of the torque converter, thereby reducing the engine torque for the purpose of suppressing a driving torque variation by an inertia change. Furthermore, during the specific period before the completion of shifting, the amount of intake air is increased more than during a period of normal operation, thus lowering the rate of decrease in the engine speed in order increase to the engine torque. At the same time, the amount of intake air is reset to that during normal operation after the specific period after the completion of shifting, to prevent the drop of the engine speed after shifting, thereby restraining the drop of the torque converter output immediately before the shifting and realizing smooth shifting.

Other objects and features of the present invention will become apparent from the embodiment described below.

DETAILED DESCRIPTION OF THE PREFERRED EMBODIMENT

Figure 1:
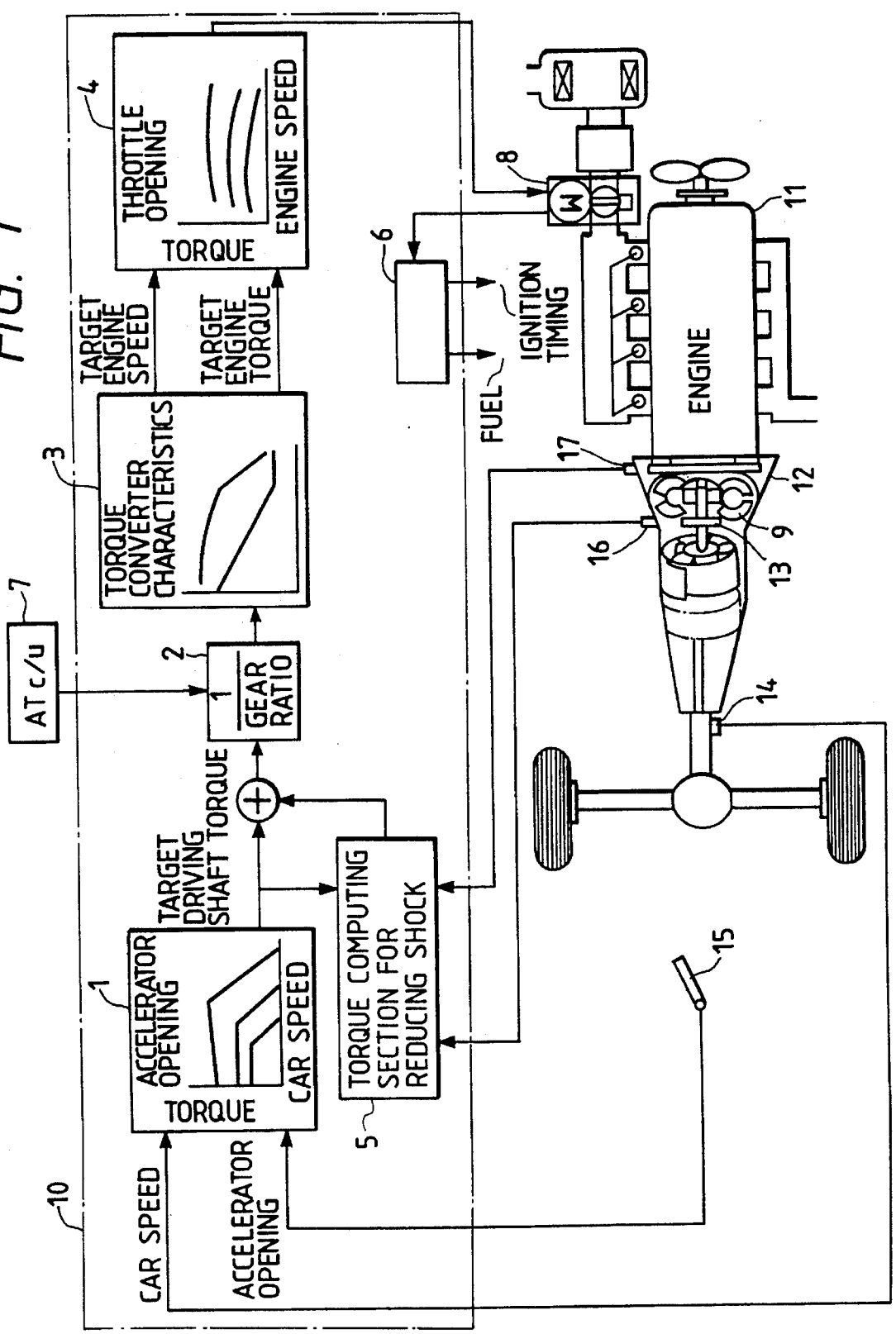
FIG. 1 is a schematic block diagram showing first embodiment of the system of a control device according to the present invention.

Hereinafter each embodiment of an automatic transmission control device and method according to the present invention with reference to the accompanying drawings. It should be noted that the same members are designated by the same reference numerals and will not be described in order to prevent redundancy.

First, a first embodiment of a control device according to the present invention will be explained by referring to FIGS. 1 to 8.

FIG. 1 is a block diagram showing the outline of the whole system of the control device of the present invention. In FIG. 1, the control device is primarily composed of an electronic throttle 8 for controlling the amount of intake air of an engine 11, an engine control unit 10, a transmission control device an accelerator opening sensor 15, a car speed sensor 14 mounted in a transmission 12, a transmission input shaft speed sensor 16, and an engine speed sensor 17.

The engine control section 10 is composed of a target driving torque computing section 1 for calculating out a target driving torque in accordance with car speed and accelerator opening, a transmission input shaft torque computing section 2 for converting the target driving torque to a torque of a transmission input shaft 13, a target engine torque computing section 3, a torque computing section 5 for lessening shift shock, a throttle opening computing section 4, and fuel injection and ignition control section 6 for computing and controlling fuel and ignition timing.

Figure 2:
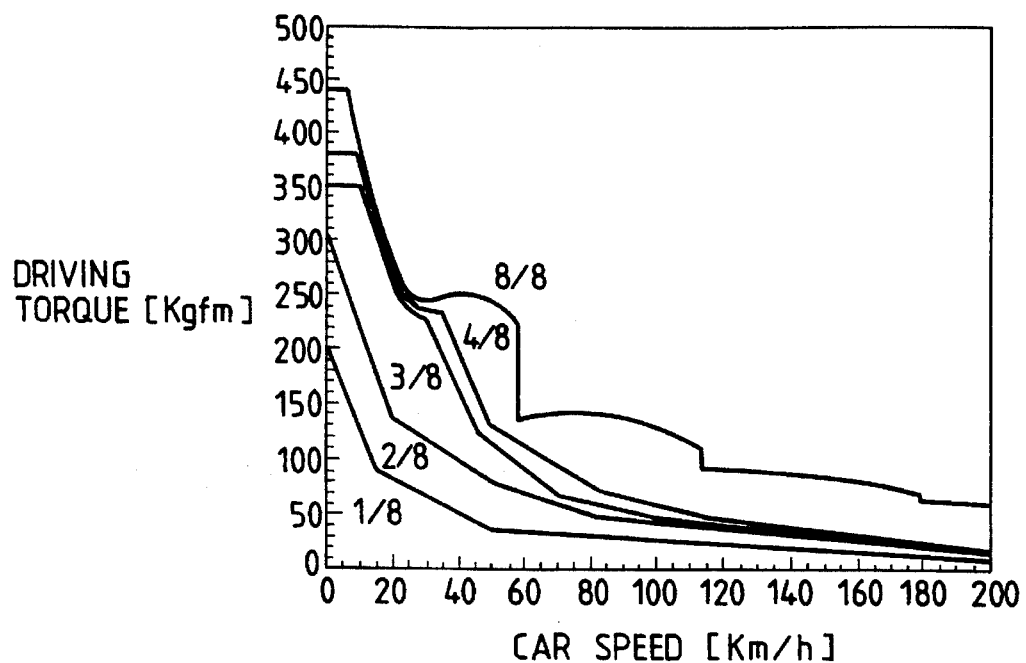
FIG. 2 is a characteristic drawing of driving torque having no step between before and after shifting.

In the target driving shaft torque computing section 1 a target driving shaft torque map according to the car speed and accelerator opening as shown in FIG. 2 has been stored. Here, for the target driving shaft torque map is set a characteristic so that the driving shaft torque before and after shifting will be equal. That is, an increase and decrease in the engine torque is controlled by means of the electronic throttle 8 in relation to a fixed engine torque, to thereby reduce a change in the driving torque which results from a difference in a change gear ratio, thus eliminating a step in the driving torque between before and after shifting. For example, if there still occurs a step in the driving torque at a maximum engine torque output at shift point, shift curves of a transmission control unit 7 will be changed in accordance with a command outputted from the engine control unit 10.

Figure 3:
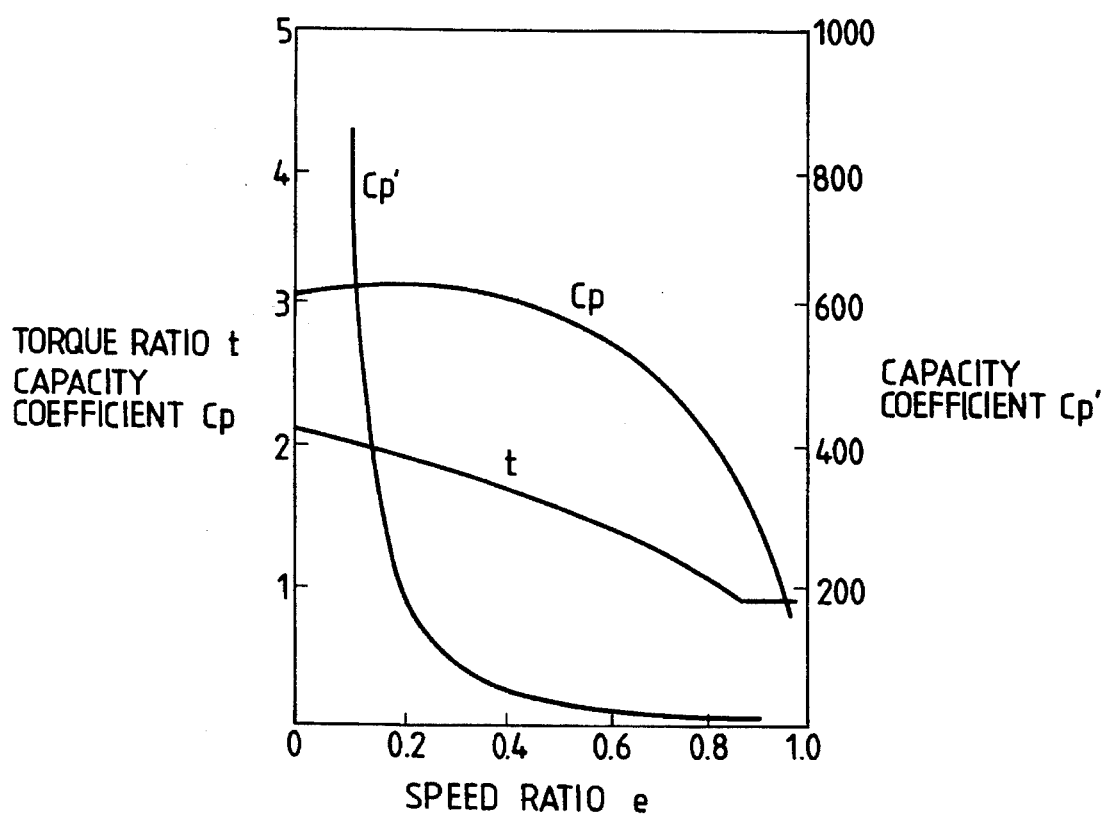
FIG. 3 is one example of a characteristic drawing of a torque converter.
Figure 4:
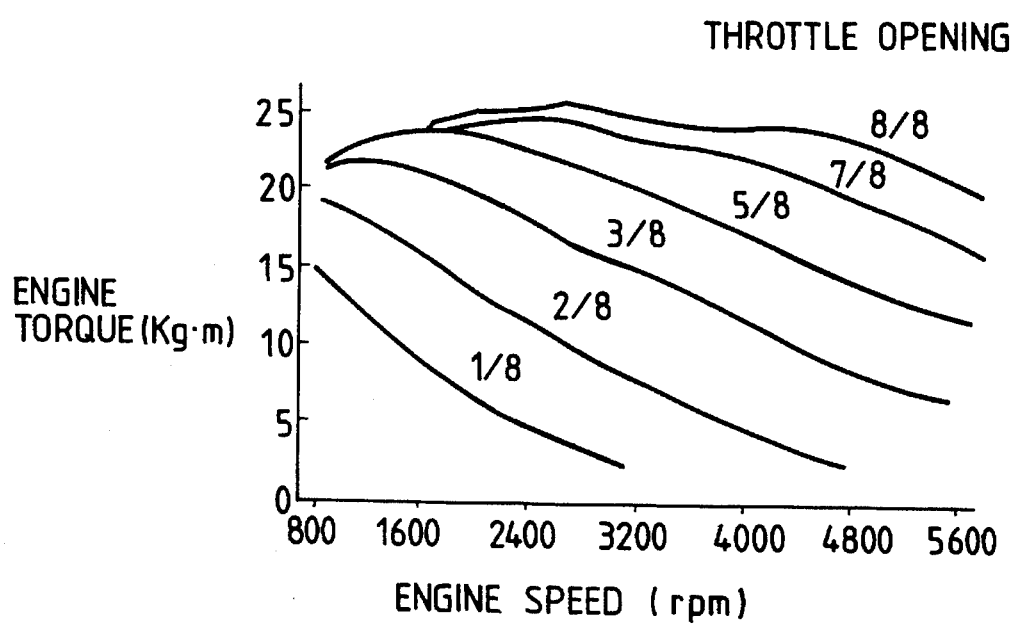
FIG. 4 is one example of a torque characteristic drawing of an engine.

In the engine torque computing section 3 the characteristics curves of the torque converter 9 as shown in FIG. 3 have previously been stored; and in the throttle opening computing section 4 the torque characteristics curves of the engine 11 as shown in FIG. 4 have previously been stored.

Figure 5:
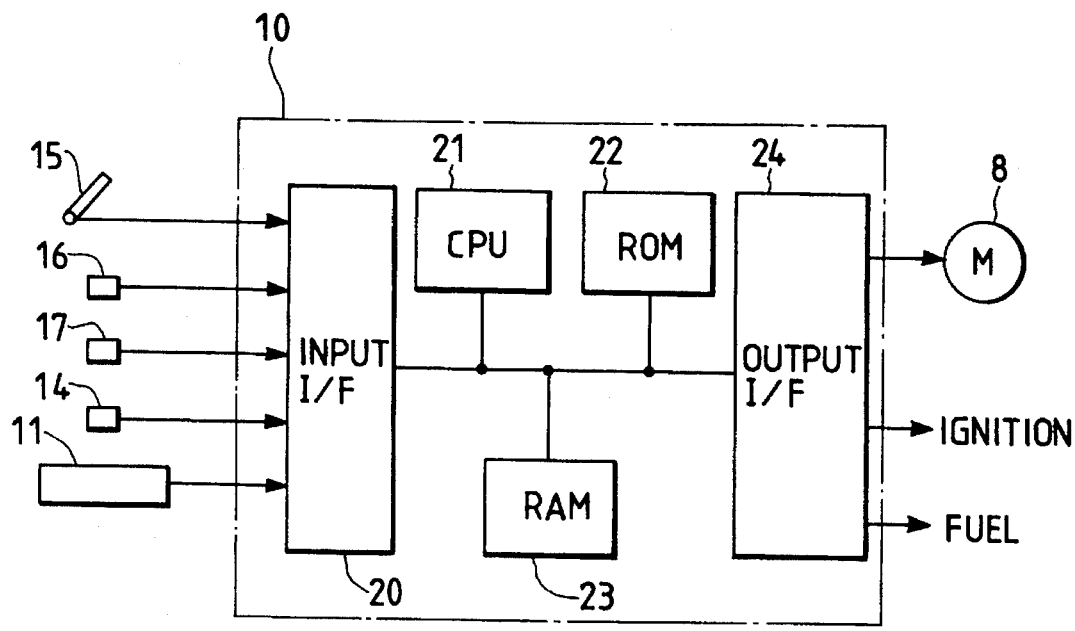
FIG. 5 is a block diagram showing the constitution of an engine control unit.

The constitution of the driving power control device has heretofore been described; the actual constitution of a hardware of the engine control unit 10, as shown in FIG. 5, comprises an input interface circuit 20, a CPU 21 which executes various computations, ROM 22 and RAM 23 for storing various data and programs, and an output interface circuit 24.

Mapped data such as engine characteristics curves, and an operation program which realizes the present invention, have been stored in memory; the CPU 21 executes operation in accordance with the operation program stored in the ROM 22 while inputting and outputting data in the process of operation by using data from the input interface 20 and the ROM 22. A result of this operation is outputted to the output interface circuit 24, thus accomplishing the above-described functions.

Next, the function of the control device of the above-described constitution will be explained.

The target driving torque computing section 1 retrieves the target driving torque map of FIG. 2 from the accelerator opening and the car speed, calculating out the target driving torque required. The torque map has been set to equalize the driving torque before and after shifting as described above.

The torque computing section 5 for reducing a shift shock serves to suppress driving torque variation resulting from the inertia of the engine and the transmission during shifting; the current driving torque is calculated out from speed information fed from the transmission input shaft sensor 16 and speed information fed from the engine speed sensor 17 to gain a difference from the target driving torque previously stated, and gives this calculated value and the target driving torque with a portion of inertia taken into consideration from the aforesaid target driving torque, to the transmission input shaft torque computing section 2.

Figure 6:
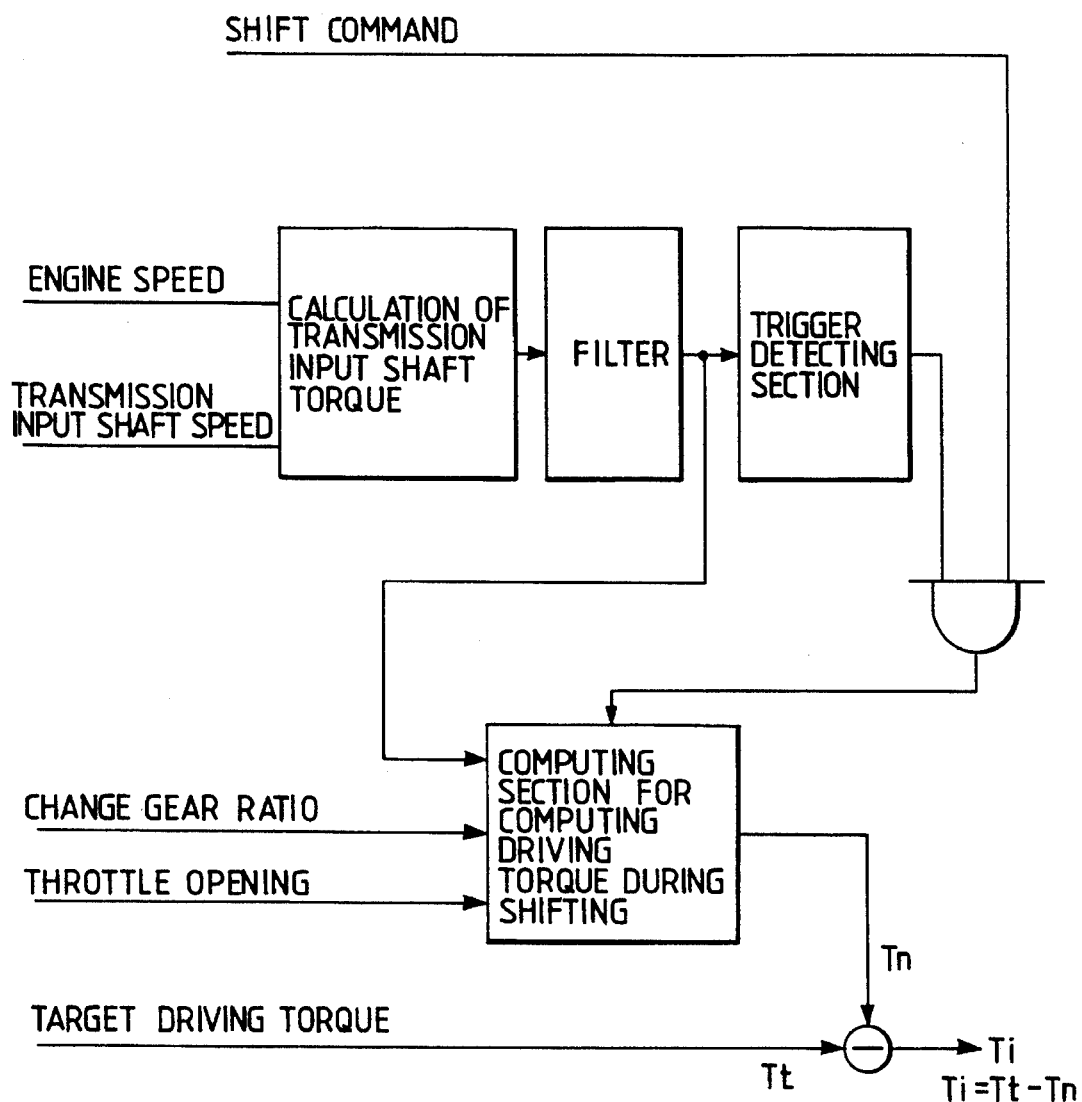
FIG. 6 is a bloc diagram showing the logic of shift shock reduction.

Next, the block diagram of the torque computing section 5 for lessening a shift shock will be explained by referring to FIG. 6. First, the transmission input shaft torque will be calculated by using the engine speed and the transmission input shaft speed. A value as thus calculated varies largely and is inadequate for use as a control parameter, and therefore it is necessary to smoothen a signal by a filter. Start of computation of the torque for lessening a shift shock is judged on the basis of a specific timing determined from the amount of variation of this signal and a shift command signal fed from the transmission control unit 7. When no torque calculation is effected, the amount of correction of the target driving torque will be set to zero and no correction will be made. After starting the torque calculation, the current driving torque Tn will be computed from the calculated torque and change gear ratio after filtering and the throttle opening, computing a difference from the output Tt of the target driving torque computing section 1. A value thus obtained will be used as the output Ti of the torque computing section 5 for lessening the shift shock.

The transmission input shaft torque computing section 2 calculates out the transmission input shaft torque by the use of a change gear ratio fed from the transmission control device 7, in relation to a value gained by adding the calculated value of torque Ti for lessening the shift shock to the target driving torque Tt previously stated.

Furthermore, the target engine torque computing section 3 calculates out a target engine speed and a target engine torque by using the torque converter characteristics on the basis of the transmission input shaft torque.

The torque converter 9, as known well, functions to amplify the torque because of slip occurring between a pump and a turbine. It is, therefore, necessary to obtain a target engine torque from a rate of torque amplification and at the same time to calculate out the target engine speed by correcting the slip. Generally, the torque converter characteristics, as shown in FIG. 3, an input/output speed ratio $e=n_1/n_2$ is plotted on the horizontal axis and a torque ratio between input and output $t=T/T_2$ and a capacity coefficient $Cp=T_1/n_1$ are plotted on the vertical axis, where $n_1$ is an input speed (engine speed), $n_2$ is an output speed (transmission input speed), $T_1$ is an input torque (engine torque), and $T_2$ is an output torque (transmission input shaft torque). The capacity coefficient Cp expresses the characteristics of the torque converter, which are determined in accordance with the size and construction of the torque converter. Here, the capacity coefficient Cp is expressed by the input torque $T_1$ and the input speed $n_1$; the capacity coefficient Cp' can be expressed, using the output torque T2 and the output speed n2 as follows:

$$Cp' = T2/n2^2 = tCp/e^2 \tag{1}$$

Then, using T2 for the target transmission input torque and n2 for the transmission input shaft speed, the capacity coefficient Cp' is determined from Equation 1. The transmission input shaft speed n2 is determined from the driving shaft speed fed from the car speed sensor 14 and the change gear ratio. When the capacity coefficient Cp' is determined, the speed ratio e and the torque ratio t are determined from the torque converter characteristics shown in FIG. 3, thence gaining the target engine torque and the target engine speed. Here, no due consideration is given to such factors as the temperature of the torque converter oil, but in actual control it is desirable to correct the variation of the torque converter characteristics caused by oil temperature change.

The throttle opening computing section 4 functions to compute the throttle opening from the engine characteristics previously stored as shown in FIG. 4, and the target engine torque and target engine speed determined by the engine torque computing section 3. Also, if a sensor for obtaining information for determining the target engine torque or the target engine speed is faulty, and if the target engine torque or the target engine speed can not be obtained by using other information, and further the faulty sensor is other than the accelerator opening sensor 15, the throttle opening will be calculated out in accordance with the accelerator opening-throttle opening curves previously set in the throttle opening computing section 4, thereby enabling to easily realize fail-safe operation in the event of a sensor trouble.

Figure 7:
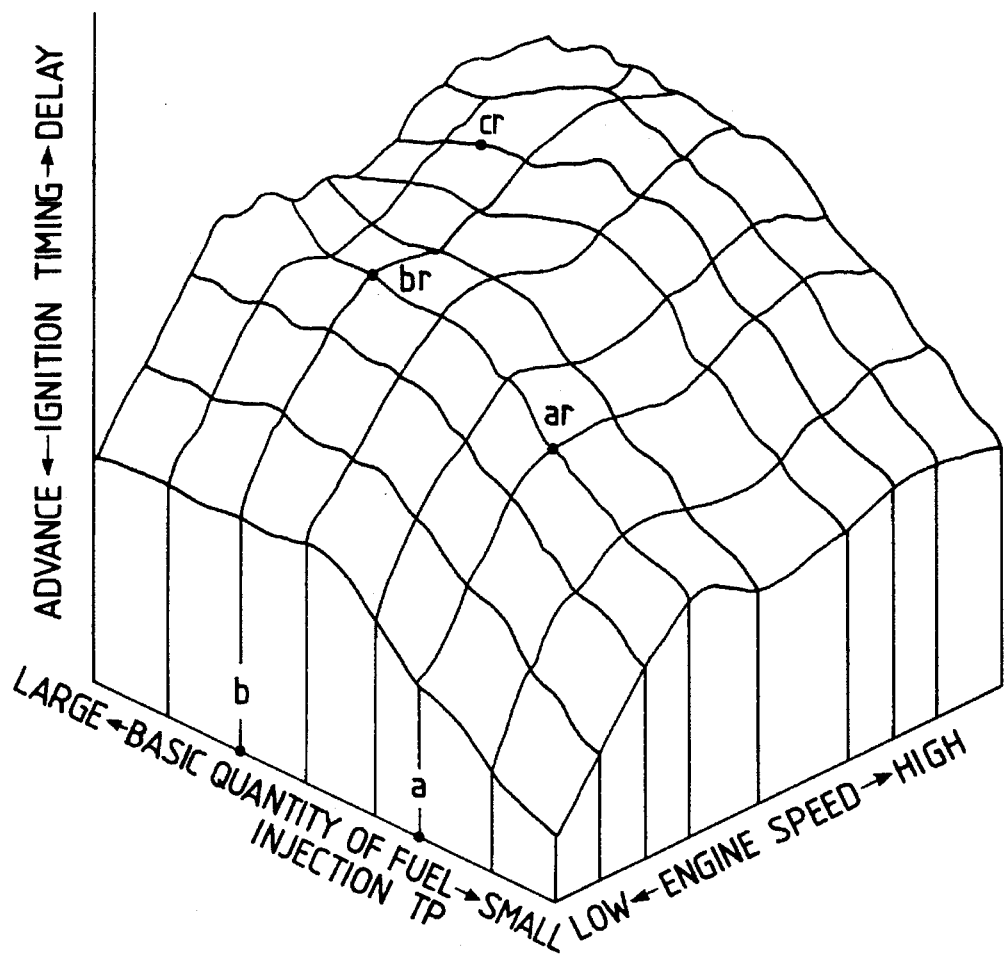
FIG. 7 is one example of an ignition timing map.

At the fuel injection and ignition timing control section 6, control is executed to set an optimum fuel and ignition timing according to the preset throttle opening, thus obtaining the target driving shaft torque. Previously stored in this fuel injection and ignition timing control section 6 is a map showing the optimum spark advance angle with the basic quantity of fuel injection TP and the engine speed as parameters as shown in FIG. 7. If the throttle valve opening changes and the basic quantity of fuel injection TP has changed from the point a to the point b in FIG. 7, the engine speed hardly rises immediately after a change of the throttle valve opening. And the corresponding ignition timing changes from ar to br. Thereafter the ignition timing changes to cr with the increase of the engine speed, thereby calculating out the optimum ignition timing. For the quantity of fuel to be injected, a similar map is prepared for the selection of the optimum quantity of fuel through the aforesaid step.

Figure 8:
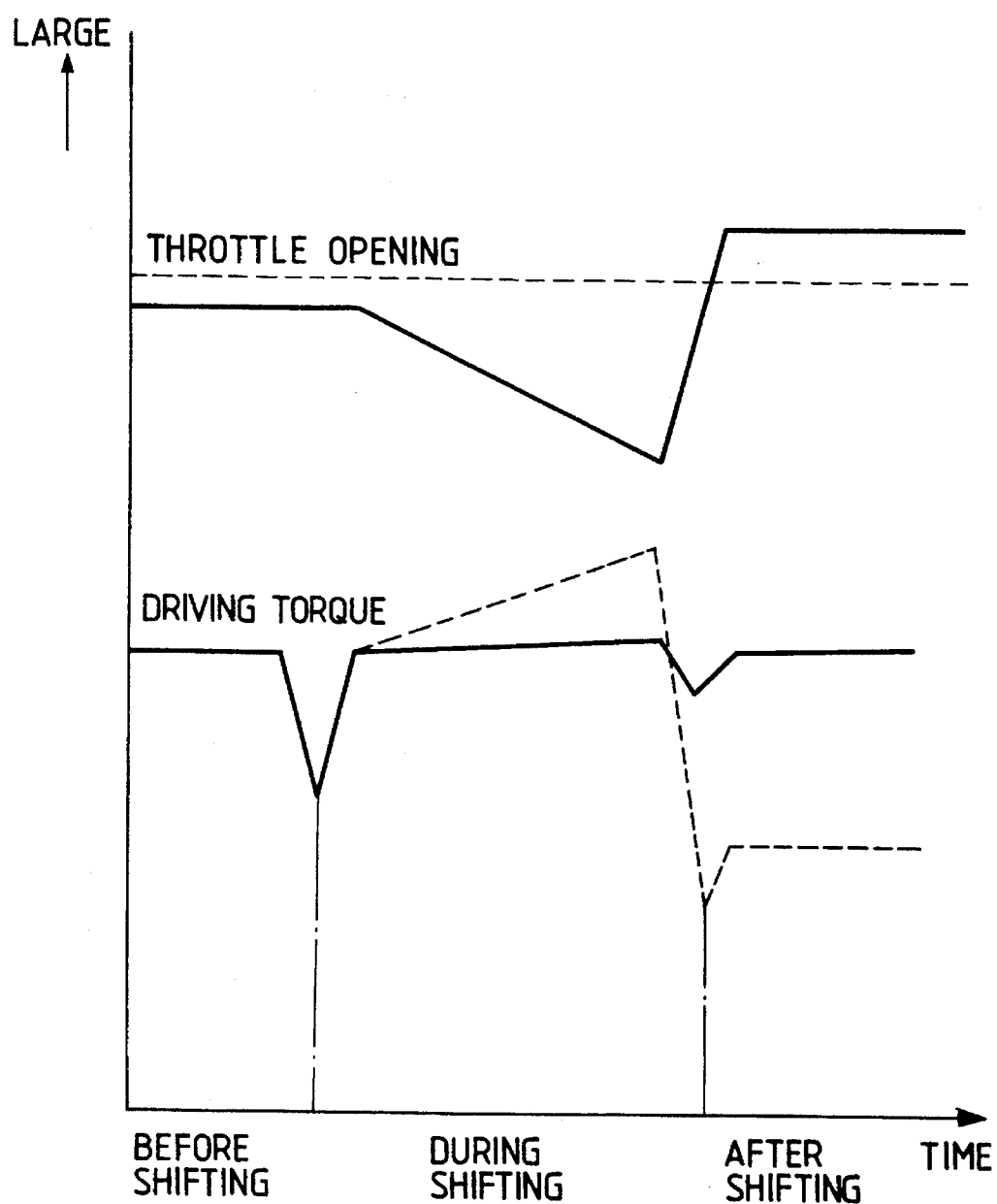
FIG. 8 is a view showing the time variation of the characteristics in the first embodiment.

In FIG. 8 is shown a relationship between the movement of the throttle during an upshift and the driving torque in the present embodiment. A broken line indicates the behavior of throttle and driving torque when no correction by the throttle is effected, while a full line indicates the behavior thereof after correction by the present invention.

In the present embodiment, the throttle is designed to open wider after shifting than before shifting so as to correct a driving torque difference between before and after shifting which occurs due to difference in the change gear ratio. That is, during shifting is decreased a shift shock in the inertia phase in which the correction of throttle opening by the shock reducing torque computing section 5 works. By this operation the driving torques before and after shifting will agree, thereby eliminating a torque difference after shifting which will become a factor of the shift shock in order to allow smooth speed changes.

Next, a second embodiment of the present invention will be explained.

Figure 9:
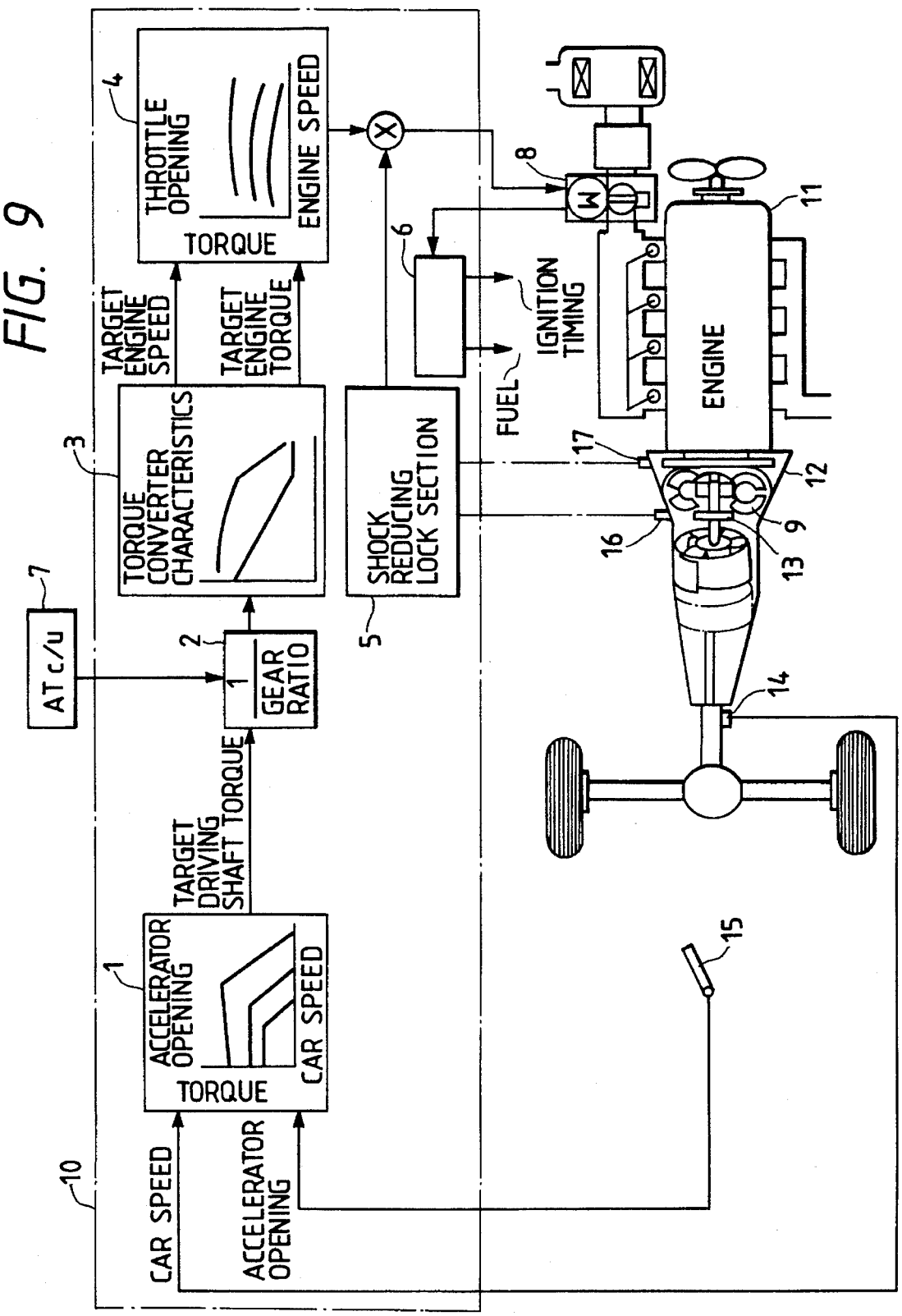
FIG. 9 is a block diagram showing a control system in the second embodiment of the present invention.

FIG. 9 is a block diagram showing the outline of system of the control device pertaining to the second embodiment. Only a difference between the present embodiment and the illustrated example in FIG. 1 is present in the location where the torque computing section for reducing a shift shock acts. Hereinafter, therefore, an explanation will be made with an importance placed on this difference.

Figure 10:
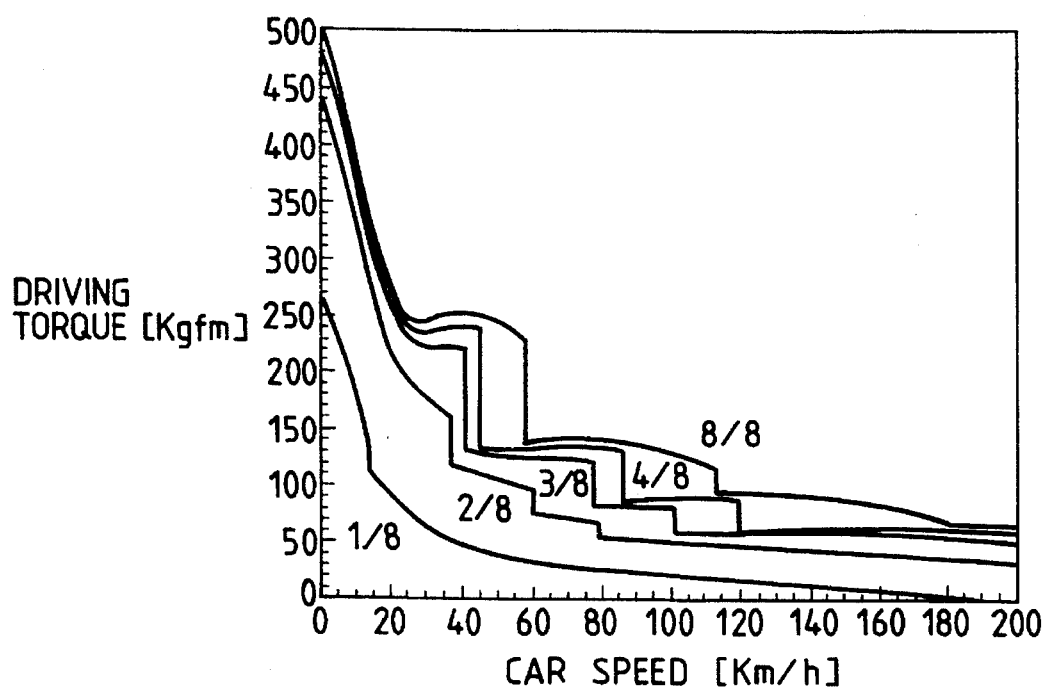
FIG. 10 is a driving torque characteristic view.

According to the target driving torque map set in the target driving torque computing section 1, there occurs a torque difference during shifting as in a conventional car as shown in FIG. 10.

Furthermore, in the shock reducing logic section 5, the change gear ratio is calculated from the transmission input shaft speed and the engine speed, and the torque reduction characteristics in relation to each shifting will be selected according to a shift position signal fed from the transmission control unit 7. The characteristics curve selected is restricted by a function of the change gear ratio as shown in FIG. 11, wherein nS is a change gear ratio at a shift starting point; nE indicates a change gear ratio at the shift end point; and n1 to n3 are control changeover points.

Figure 11:
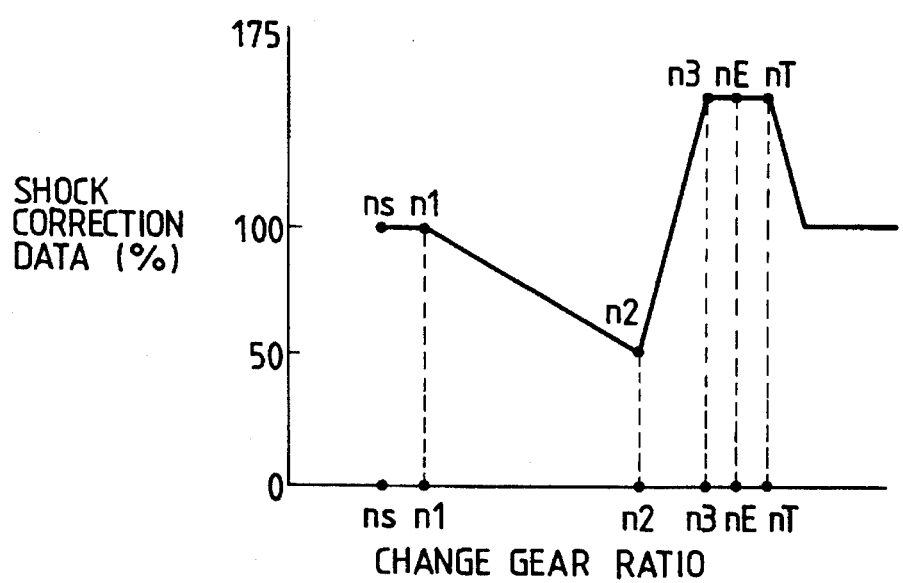
FIG. 11 is a characteristic view of engine torque for shock reduction control.

In FIG. 11, when gear shifting starts, the shock correction data gradually decreases to 50% from a point where the change gear ratio becomes n1, and rapidly increases to 150% from the change gear ratio n2. Then, at the point of n3, this multiplier is held until the point nT where the transmission input shaft speed reverses to positive or zero; after this reversion, the shock correction data decreases to 100% in a fixed time. At this time the gears are already in engagement, and so if the throttle is left open for a prolonged duration, the car will start automatically. To prevent this, the speed during a period of throttle closing changes at a higher rate than the speed at which the multiplier decreases from the point of n1.

Figure 12:
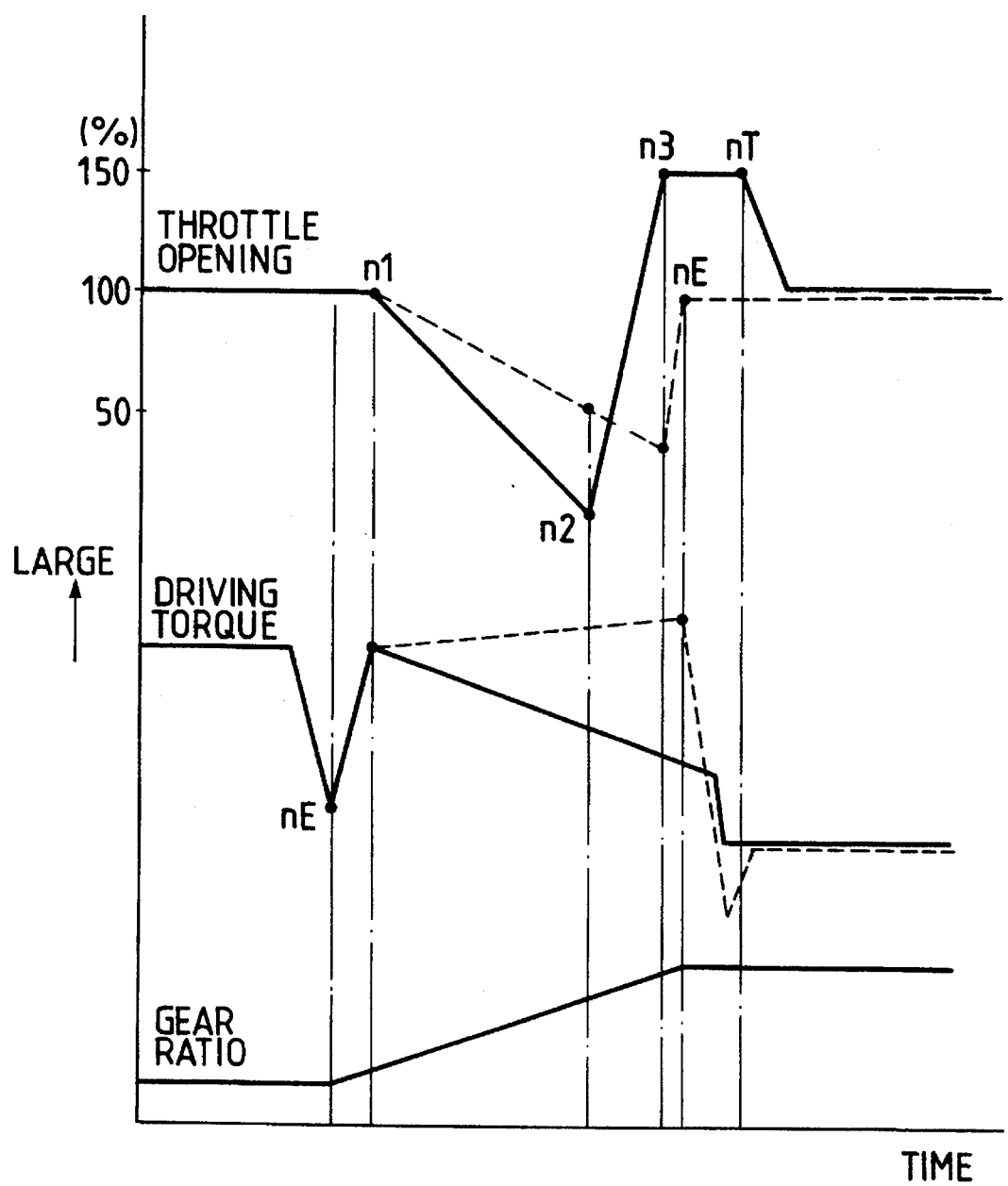
FIG. 12 is a view showing the time variation of characteristics in the second embodiment.

FIG. 12 shows a behavior of the present embodiment of the control device, in which the throttle opening starts lowering from n1 and turns upwardly at n2; at n3 the throttle opening, after holding its value, returns to a normal opening. The broke line indicates its movement during normal operation, from which it is understood that a torque drop at the end of shifting as appearing with the driving torque can be prevented, thereby lessening a shift shock.

The output of the shock reducing logic section 5 is multiplied to the target throttle opening calculated out by the throttle opening computing section 4. That is, up to n1 the output of the throttle opening computing section 4 itself (100%) is outputted and thereafter the throttle opening is so controlled as to vary at a specified rate as shown in FIG. 11.

The embodiments of the present invention have heretofore been described in detail. It should be noted, however, that the present invention is not limited only thereto but various changes in design are possible within the scope of the present invention.

For example, the engine torque is controlled by the throttle in each of the above-described embodiments, but a large-capacity ISC (Idle Speed Control) valve may be used in place of the throttle to realize these embodiments. Also, the first embodiment can be realized by decreasing the quantity of fuel before shifting and increasing the quantity of fuel after shifting.

Furthermore it is apparent that a better multiplier effect can be obtained by combining the first and second embodiments.

According to the control device of the automatic transmission of the present invention, as is understood from the above description, it is possible to eliminate a torque difference between before and after shifting and to suppress an inertia variation during shifting, and therefore the driver will hardly feed a torque variation during shifting. Also, even when a sensor trouble is encountered, a shift can be made to the same control as conventional one and therefore driving safety is insured without impairing operation performance.

What is claimed is:

1. A control device for an automatic transmission having a control means for controlling an engine torque and a transmission control means for controlling said automatic transmission, said control device utilizing a targeted engine torque as a function of a targeted driving torque and a torque converter characteristic, and comprising: a means for setting a driving torque immediately before starting shifting and a driving torque immediately after the completion of shifting at a nearly equal value, and a means for restraining torque variation during shifting.

2. A control device for an automatic transmission according to claim 1, wherein said control means for controlling said engine torque is an electronically controlled throttle valve.

3. A control device for an automatic transmission according to claim 1, wherein said control means for controlling said engine torque is a large-capacity idle speed control valve.

4. A control device for an automatic transmission having a control means for controlling an engine torque, a transmission control means for controlling an automatic transmission, and a means for decreasing said engine torque during shifting to reduce a shift shock, said control device utilizing a targeted engine torque as a function of a targeted driving torque and a torque converter characteristic, and comprising: a means for increasing said engine torque for a specific period before the completion of shifting greater than normal engine torque, and for resetting to a normal output said engine torque after a specific period after the completion of shifting.

5. A control device for an automatic transmission according to claim 4, wherein said control means for controlling said engine torque is an electronic throttle valve.

6. A control device for an automatic transmission according to claim 4, wherein said control means for controlling said engine torque is a large-capacity idle control valve.

7. A control device for an automatic transmission having a control means for controlling an engine torque, a transmission control means for controlling an automatic transmission, and a means for reducing an engine torque during shifting, said control device utilizing a targeted engine torque as a function of a targeted driving torque and a torque converter characteristic, and comprising: a means for setting a driving torque immediately before the start of shifting an a driving torque immediately after the completion of shifting to a nearly equal value, and a means for increasing said engine torque for a specific period before the completion of shifting greater than a normal engine torque, and for resetting said engine torque after a specific period after the completion of shifting to a normal output.

8. A control method for controlling an engine torque and operation of an automatic transmission, comprising the steps of setting a driving torque immediately before the start of shifting and a driving torque immediately after the completion of shifting to a nearly equal value based on a targeted engine torque as a function of a targeted driving torque and a torque converter characteristic, and restraining torque variation during shifting.

9. A control method for an automatic transmission according to claim 8, wherein said engine torque is controlled by an electronically controlled throttle valve.

10. A control method for an automatic transmission according to claim 8, wherein said engine torque is controlled by a large-capacity idle speed control valve.

11. A control method for an automatic transmission for reducing a shift shock comprising the steps of controlling an engine torque by utilizing a targeted engine torque as a function of targeted driving torque and a torque converter characteristic, controlling operation of said automatic transmission, and deceasing said engine torque during shifting, increasing said engine torque for specific period before the completion of shifting greater than a normal engine torque, and resetting said engine torque after a specific period after the completion of shifting to a normal output.

12. A control method for an automatic transmission according to claim 11, wherein said engine torque is controlled by an electronically controlled throttle valve.

13. A control method for an automatic transmission according to claim 11, wherein said engine torque is controlled by a large-capacity idle control valve.

14. A control method for an automatic transmission, comprising the steps of controlling an engine torque utilizing a targeted engine torque as a function of targeted driving torque and a torque converter characteristic, controlling operation of said automatic transmission, and for decreasing said engine torque during shifting for the purpose of reducing a shift shock, setting a driving torque immediately before the start of shifting and a driving torque immediately after the completion of shifting, increasing said engine torque for a specific period before the completion of shifting greater than a normal engine torque, and resetting said engine torque after a specific period upon completion of shifting to a normal output.

* * * * *